(12) United States Patent
Kamber et al.

(10) Patent No.: US 10,131,813 B2
(45) Date of Patent: Nov. 20, 2018

(54) AMBIENT CURE COMPOSITIONS FOR MAKING COATINGS HAVING HUMIDITY AND CORROSION RESISTANCE AND METHODS OF USE

(71) Applicants: Dow Global Technologies LLC, Midland, MI (US); Rohm and Haas Company, Philadelphia, PA (US)

(72) Inventors: Nahrain E. Kamber, Midland, MI (US); John N. Argyropoulos, Midland, MI (US); Paul J. Popa, Auburn, MI (US); Scott A. Murray, Berks, PA (US)

(73) Assignees: Dow Global Technologies LLC, Midland, MI (US); Rhm and Haas Company, Philadelphia, PA (US)

( * ) Notice: Subject to any disclaimer, the term of this patent is extended or adjusted under 35 U.S.C. 154(b) by 0 days.

(21) Appl. No.: 15/214,907

(22) Filed: Jul. 20, 2016

(65) Prior Publication Data
US 2018/0022956 A1 Jan. 25, 2018

Related U.S. Application Data

(60) Provisional application No. 62/195,442, filed on Jul. 22, 2015.

(51) Int. Cl.
| | | |
|---|---|---|
| *C08K 5/00* | (2006.01) | |
| *C09D 175/12* | (2006.01) | |
| *C09D 5/08* | (2006.01) | |

(52) U.S. Cl.
CPC ............ *C09D 175/12* (2013.01); *C09D 5/08* (2013.01)

(58) Field of Classification Search
None
See application file for complete search history.

(56) References Cited

U.S. PATENT DOCUMENTS

| | | | |
|---|---|---|---|
| 4,612,049 A * | 9/1986 | Berner | C09D 5/086 106/14.13 |
| 5,288,802 A | 2/1994 | Walters et al. | |
| 5,336,566 A | 8/1994 | Rehfuss | |
| 5,665,433 A | 9/1997 | Moussa et al. | |
| 5,891,960 A | 4/1999 | Claar et al. | |
| 6,169,150 B1 | 1/2001 | Swarup et al. | |
| 6,177,514 B1 | 1/2001 | Pathak et al. | |
| 6,251,973 B1 * | 6/2001 | Robinson | C09D 201/025 524/188 |
| 8,431,730 B2 | 4/2013 | Abi-Karam et al. | |
| 8,653,174 B2 | 2/2014 | Anderson et al. | |
| 2009/0104363 A1 * | 4/2009 | Abi-Karam | C09D 5/002 427/385.5 |
| 2011/0313091 A1 | 12/2011 | Argyropoulos et al. | |
| 2014/0178475 A1 * | 6/2014 | Figueiredo | A61K 47/12 424/489 |
| 2014/0369850 A1 | 12/2014 | Popa et al. | |

FOREIGN PATENT DOCUMENTS

EP 0760387 3/1997

OTHER PUBLICATIONS

MSDS Sheet for dodecylbenzenesulfonic acid.*

* cited by examiner

*Primary Examiner* — Robert T Butcher
(74) *Attorney, Agent, or Firm* — Karl E. Stauss; Cantor Colburn LLP

(57) ABSTRACT

The present invention provides substantially isocyanate-free multicomponent compositions useful in making rapid dry primer compositions and coatings, the compositions comprising one or more carboxylic acid compounds that contain one of a benzothiazole, benzoxazole, or benzimidazole group, preferably, that contain a benzothiazole group, one or more hydrophobic sulfonic acid catalyst, one or more pigment, extender or filler, one or more a) polycarbamates from alkyd polyol or acrylic polyol and one or more b) polyaldehydes or the acetal or hemiacetal thereof as a second component. The multicomponent compositions cure quickly at a temperature of from 0° C. to less than 80° C. to form a crosslinked polyurethane coating having improved humidity and corrosion resistance.

19 Claims, No Drawings

AMBIENT CURE COMPOSITIONS FOR MAKING COATINGS HAVING HUMIDITY AND CORROSION RESISTANCE AND METHODS OF USE

The present invention relates to ambient to low bake temperature (less than 80° C.) curable substantially isocyanate free multicomponent polycarbamate and polyaldehyde compositions that cure to form a crosslinked polyurethane with improved humidity and corrosion resistance and that are useful as direct to metal coatings, such as primers. More particularly, it relates to multicomponent compositions useful in direct to metal coatings comprising one or more pigments, extenders and/or fillers, one or more ion-exchanged amorphous silicas containing a metal cation, preferably a divalent or trivalent metal cation, such as calcium, one or more carboxylic acid compounds that contain one of a benzothiazole, benzoxazole, or benzimidazole group, preferably, a benzothiazole group, one or more hydrophobic sulfonic acid catalysts, one or more a) polycarbamates of an alkyd polyol or an acrylic polyol, and b) one or more polyaldehydes in a component separate from the one or more polycarbamates.

The use of polyurethanes in coating compositions, including direct to metal applications such as automotive primers, is generally known; such compositions may be cured from ambient temperature to less than 80° C. and provide crosslinked coatings having good to excellent hardness, scratch resistance and solvent resistance. A primer surfacer is a primer that is designed to provide adhesion between the substrate surface and the basecoat and clear coat; it is analogous to a traditional primer. The primer surfacer also provides corrosion resistance and fills any defects or imperfections in the substrate surface prior to painting. However, such currently available compositions contain (poly)isocyanates which are environmentally unfriendly.

Polyurethanes can be made from substantially isocyanate free compositions. Unfortunately, the humidity and corrosion resistance of known substantially isocyanate free polyurethanes in direct to metal applications, such as automotive primers, needs improvement. Although numerous additives and pigments are known to improve the humidity and corrosion resistance of coatings, many of these products were observed to provide no benefit and in many cases have been found to adversely affect the curing and properties in isocyanate-free coatings for making polyurethanes.

Recently, patent publication no. US2011/0313091A1, to Anderson et al. discloses a substantially isocyanate free, ambient to low bake temperature (less than 80° C.) curable multicomponent composition for aldehyde-crosslinking of carbamates for making polyurethanes; however, the composition fails to disclose compositions and coatings that provide the needed humidity and corrosion resistance for use in direct to metal applications.

The present inventors have sought to solve the problem of providing a substantially isocyanate free primer composition that provides improved humidity and corrosion performance, for example, in direct to metal applications, such as for example, automotive refinish primer surfacers.

STATEMENT OF THE INVENTION

1. In accordance with the present invention, substantially isocyanate free, ambient to low bake temperature (less than 80° C.) curable, multicomponent primer compositions useful as direct to metal coatings comprise one or more pigments, extenders and/or fillers, one or more ion-exchanged amorphous silicas containing a metal cation, preferably a divalent or trivalent metal cation, such as calcium, one or more carboxylic acid compounds that contain a benzothiazole, benzoxazole, or benzimidazole group, preferably, a benzothiazole group, one or more hydrophobic sulfonic acid catalysts, one or more a) polycarbamates of an alkyd polyol, an acrylic polyol, or their mixtures, and one or more b) polyaldehydes or acetals or hemiacetals thereof in a component separate from the one or more polycarbamates.

2. The compositions of the present invention in accordance with 1, above, wherein the one or more ion-exchanged amorphous silicas containing a metal cation are chosen from cation-exchanged amorphous silicas containing divalent metals or trivalent metals, such as calcium, magnesium, zinc, copper, tin or silver, preferably, calcium or zinc.

3. The compositions of the present invention in accordance with any of 1 or 2, above, wherein the total amount of the one or more ion-exchanged amorphous silicas ranges from 2.5 to 12.5 wt. %, or, preferably, from 5 to 10 wt. %, based on the total solids weight of the composition.

4. The compositions of the present invention in accordance with any of 1, 2, or 3, above, wherein the one or more carboxylic acid compounds that contain one of a benzothiazole, benzoxazole, or benzimidazole group is chosen from benzothiazole substituted dicarboxylic acids, e.g. benzothiazol-2-ylthio succinic acids.

5. The compositions of the present invention in accordance with any of 1, 2, 3 or 4, above, wherein the total amount of the one or more carboxylic acid compounds that contain one of a benzothiazole, benzoxazole, or benzimidazole group benzothiazoles ranges from 0.5 to 5 wt. %, or, preferably, from 1 to 3 wt. %, based on the total solids weight of the composition.

6. The compositions of the present invention in accordance with any of 1, 2, 3, 4, or 5, above, wherein the one or more hydrophobic sulfonic acid catalysts have a solubility in water at 25° C. and 100 kPa of less than 40 wt. %, more preferably less than 20 wt. % and most preferably less than 15 wt. %.

7. The compositions of the present invention in accordance with any of 1, 2, 3, 4, 5, or 6, above, wherein the total amount of the one or more hydrophobic sulfonic acid catalysts ranges from 0.01 to 10 wt. %, or, preferably, from 0.1 to 5 wt. %, or, more preferably, from 0.2 to 2.5 wt. %, based on the total solids weight of the composition.

8. The compositions of the present invention in accordance with any of 1, 2, 3, 4, 5, 6, or 7, above, further comprising one or more epoxy silane, preferably a hydrolysable epoxy silane, for example, epoxyalkyl alkoxysilanes such as epoxypropyl trialkoxysilanes or, more preferably, epoxypropyl tri methoxylsilanes.

9. The compositions of the present invention in accordance with any of 1, 2, 3, 4, 5, 6, 7 or 8, above, having a pigment volume concentration (% PVC) of from 15 to 60 or, preferably, from 25 to 50%, or, more preferably, 30 to 45%.

10. The compositions of the present invention in accordance with any of 1, 2, 3, 4, 5, 6, 7, 8, or 9, above, wherein the one or more a) polycarbamates is a polycarbamate prepared from an alkyd polyol having a hydroxyl number from 50 to 250 or, preferably, from 100 to 200.

11. The compositions of the present invention in accordance with any of 1, 2, 3, 4, 5, 6, 7, 8, 9 or 10, above, wherein the polycarbamate is a polycarbamate of an alkyd polyol and the alkyd polyol is a short or medium oil alkyd polyol.

12. The compositions of the present invention in accordance with any of 1, 2, 3, 4, 5, 6, 7, 8, 9, 10 or 11, above, wherein polycarbamate is a polycarbamate of an alkyd polyol and the alkyd polyol is a drying oil alkyd polyol.

13. The compositions of the present invention in accordance with any of 1, 2, 3, 4, 5, 6, 7, 8, 9, 10, 11 or 12, above, wherein the polycarbamate is a polycarbamate of an alkyd polyol and alkyd polyol is the reaction product of one or more monocarboxylic fatty acid, or triglyceride, one or more polycarboxylic acid having two or more carboxylic acid, salt or halide groups, and one or more polyalcohol having two or more, or, preferably 4 or more hydroxyl groups, such as erythritol or pentaerythritol.

14. The compositions of the present invention in accordance with any of 1, 2, 3, 4, 5, 6, 7, 8, or 9, above, wherein the one or more a) polycarbamates is a polycarbamate prepared from an acrylic polyol having an hydroxyl number of from 50 to 250, or, preferably, from 100 to 200.

15. The compositions of the present invention in accordance with any of 1, 2, 3, 4, 5, 6, 7, 8, 9, 10, 11, 12, 13 or 14, above, wherein the one or more b) polyaldehydes, acetals or hemiacetals thereof is a cycloaliphatic dialdehyde, preferably, a 1,3 cyclohexanedicarboxaldehyde (CHDA), a 1,4 cyclohexanedicarboxaldehyde (CHDA), their admixture, or acetals or hermiacetals thereof.

16. The compositions of the present invention in accordance with any of 1 to 15, above, wherein the compositions further comprise one or more curing inhibitors, such as, for example, water or an alcohol, preferably a $C_1$ to $C_5$ alkyl alcohol.

17. The compositions of the present invention in accordance with any of 1 to 16, above, wherein the compositions comprise one or more pigment and one or more extender, preferably titanium dioxide as the pigment and talc or silica as the extender.

18. In another aspect, the present invention provides methods for making the compositions in accordance with any of 1 to 17, above, comprising grinding together the one or more ion-exchanged amorphous silica, the one or more dicarboxylic acid catalysts, the one or more hydrophobic sulfonic acid catalysts with one or more fillers, such as talc, pigments, such as titanium dioxide or iron oxides, and/or extenders, such as, clay or silica and with one or more dispersant, such as a polycarboxylic acid copolymer like polyacrylic acid, polymethacrylic acid, copolymers thereof, and salts thereof to form a pigment mixture.

19. In yet another aspect, the present invention provides methods for using the compositions in accordance with any of 1 to 17, above, comprising applying the composition to a metal substrate, such as metal, pretreated metal, or primed metal to form a coating layer, and curing the coating layer to form a crosslinked polyurethane at a temperature of from ambient to 80° C., or, preferably, from ambient to 60° C., or, preferably, from ambient to 30° C. The coating may be cured for a period long enough to enable sanding of the coating layer.

20. The methods in accordance with 19, above, further comprising applying a pigmented basecoat or colorcoat composition, such as an acrylic basecoat or colorcoat composition, to the coating layer to form a pigmented basecoat or colorcoat layer and curing the pigmented basecoat or colorcoat layer to form a cured pigmented basecoat or colorcoat.

21. The methods in accordance with 20, above, further comprising applying a clearcoat composition to the cured pigmented basecoat or colorcoat layer, and curing the clearcoat composition to form an automotive coating finish.

22. An finish comprising a metal substrate, such as metal, pretreated metal, or primed metal, one or more crosslinked polyurethane coating layers from the compositions of any of 1 to 17, above, on the metal substrate, a cured pigmented basecoat or colorcoat layer on the one or coating layers, and a cured clearcoat layer on the cured pigmented basecoat or colorcoat layer.

As used herein, the term "ASTM" stands for ASTM International, the name of an organization headquartered in West Conshohocken, Pa., USA.

As used herein, the term "alkyd" means a polyester made from reacting one or more polyalcohols and one or more polycarboxylic acids, along with one or more monocarboxylic acids, such as long-chain fatty acids, their corresponding triglycerides, and mixtures thereof. The term "oil-based alkyd resin" means a polyester which has been modified by addition of saturated or unsaturated fatty acids or their corresponding triglycerides; and the term "oil-free alkyd resin" means polyesters that have been modified by addition of saturated monocarboxylic acids.

As used herein, the term "drying alkyd resins" means those alkyds made from polyunsaturated fatty acids or triglycerides (drying oils), such as linseed oil, that can dry by air oxidation, or autoxidative drying. Drying alkyds are usually used as the film former for coatings or inks.

As used herein, the term "non-drying alkyd resins" means those alkyds made from non-drying monocarboxylic acid oils, such as coconut oil. Non-drying alkyds may be crosslinked through their hydroxyl functional groups to become part of the film-former.

As used herein, terms referring to "oil lengths" of alkyd resins, e.g. short oil, medium oil or long oil alkyd refer to the proportion of the oil or fatty acid in the alkyd resin, by the weight percent of monocarboxylic acid oils, fatty acids or triglycerides in the alkyd, based on total solids. Alkyd resins are classified, as follows: "Very long" is over 70%, "long" is 56-70%, "medium" is 46-55% and "short" is below 45%.

As used herein, the term "ambient temperature" means room temperature and "ambient temperature curable" means capable of reacting in a chemically transforming process at from 0° C. to outdoor temperatures.

As used herein, the term "average number of carbamate groups" means the total number average molecular weight of a given polycarbamate as determined by gel permeation chromatography (using a polystyrene standard) divided by the carbamate equivalent weight of the polycarbamate. The carbamate equivalent weight (CEW) on solids is calculated using the following equation:

$$CEW=(OHEW_{polyol}+(43\times Carbamate\ Conversion))\div Carbamate\ Conversion,$$

wherein the carbamate conversion is approximated using the following equation:

$$Carbamate\ Conversion=(OH\#_{polyol}-OH\#_{polycarbamate})\div OH\#_{polyol}.$$

Note that a Carbamate Conversion can be expressed as a percentage when multiplied by 100%.

As used herein, the term "curing" means subjecting to conditions effective for chemically transforming a material, such as by crosslinking it or hardening it.

As used herein, the term "curing temperature" means the degree of heat or cold effective for chemically transforming the ambient temperature curable multicomponent compositions of the present invention to form a crosslinked polyurethane.

As used herein, the term "calculated oil content (%)" means for an alkyd polyol the weight proportion of the weight percent of monocarboxylic acid oils, fatty acids or triglycerides in the alkyd, based on total solids used to make the alkyd polyol.

As used herein, the term "OH value (mg KOH/g)" or "hydroxyl number" or "OH number" means for an alkyd polyol or an acrylic polyol the amount in milligrams of potassium hydroxide (KOH) per gram polyol (mg KOH/g polyol) determined by following the titration methods set forth in ASTM D4274-11 (Standard Test Methods for Testing Polyurethane Raw Materials: Determination of Hydroxyl Numbers of Polyols (2011) Test Method A) performed at room temperature using as reagents 4-(dimethylamino) pyridine catalyst in tetrahydrofuran (THF) and acetic anhydride in THF and as titrant with 1N KOH in methanol.

As used herein, the term "AV (mg KOH/g)" or "acid number" means the acid value of an alkyd polyol or acrylic polyol as determined by following the titration methods set forth in ASTM D1639-90 (1996) at room temperature using 0.1 N potassium hydroxide in methanol as titrant and a 50/50 (v/v) mix of isopropanol and xylenes as solvent.

As used herein, the term "extender" and the term "filler" are used interchangeably.

As used herein, the term "multicomponent composition" means a composition comprising two or more components, each one having at least one ingredient, wherein the components upon mixing provide a composition that is free of curing inhibitors and reacts, sets or cures within 7 days at a temperature of from ambient temperature to 80° C.

As used herein, the term "polyaldehyde" means a molecule containing two or more aldehyde groups or their hydrates, or as acetals or hemiacetals, wherein the molecule is capable of performing as described herein and is capable of reacting with the polycarbamate during the curing step so as to form the crosslinked polyurethane. The aldehyde group can be written herein as —C(=O)H or —CHO. The term "polyaldehyde" is not used herein to mean a polymeric substance made by self-polymerizing an aldehyde monomer.

As used herein, the term "polycarbamate" means a molecule containing an average of two or more carbamate groups ($H_2NC(O)O$—), wherein the molecule is capable of reacting with a polyaldehyde during curing so as to form a polyurethane.

As used herein, the term "pigment volume concentration" or "% pigment volume concentration" or "% PVC" means the quantity determined by the following equation for the entire multicomponent composition:

$$100\% \times \frac{(\text{volume of pigment(s)} + \text{volume of extender(s)} + \text{volume of filler(s)})}{\text{total dry volume of coating}}.$$

As used herein, the term "solvent/diluents" as used herein comprises all conventional non-polar and polar organic solvents and diluents.

As used herein, the term "substantially free of isocyanate groups" or "substantially isocyanate-free" means having from 0 to 5 mole percent (mol %) of —N=C=O groups (i.e., isocyanate groups) based on total moles of carbamate groups plus isocyanate groups in the composition, preferably, less than 3 mol %, or, more preferably, less than 1 mol %, and, still more preferably, less than 0.1 mol %.

As used herein, the term "substantially formaldehyde free" is less than 500 ppm based on the total weight of polyaldehyde solids.

As used herein, the term "total solids" or "solids" refers to resins, reactants and all non-volatile additives or ingredients, including catalysts; solids does not include water or volatile solvents (which volatilize under use conditions of cure at from 0° C. to 80° C.).

As used herein, the term "wt. %" means weight percent or percent by weight.

Unless otherwise stated, all units of pressure and temperature refer to standard pressure and room temperature.

All phrases comprising parentheses denote either or both of the included parenthetical matter and its absence.

Unless otherwise stated, all ranges are inclusive and combinable. For example, a stated range (% PVC) of from 15 to 60 or, preferably, from 25 to 50%, or, more preferably, 30 to 45% means any of from 15 to 60% PVC, or, from 15 to 25% PVC, or, from 15 to 50% PVC, or, from 15 to 30% PVC, or, from 15 to 45% PVC, or, from 45 to 60% PVC, or, from 25 to 60% PVC, or, preferably, from 25 to 50% PVC, or, preferably, from 25 to 30% PVC, or, preferably, from 30 to 50% PVC, or, preferably, from 45 to 50% PVC, or, preferably, from 25 to 45% PVC, or, more preferably, from 30 to 45% PVC.

The present invention provides multicomponent compositions for making humidity and corrosion resistant coatings, such as primers and coatings for direct to metal applications. Though isocyanate-free coatings exist on the market, the multicomponent compositions of the present invention allow for improved performance in direct to metal applications. The compositions of the present invention have demonstrated, for example, improvements in humidity resistance for an alkyd primer applied direct to metal.

The multicomponent compositions of the present invention further comprise one or more ion-exchanged amorphous silicas, preferably, cation exchanged, such as calcium ion exchanged amorphous silicas.

Preferred suitable ion-exchanged amorphous silicas may include, for example, any of the silicas available as SHIELDEX C303 (average particle diameter: 2.5 to 3.5 micron, Ca concentration: 3 wt %), SHIELDEX AC3 (average particle diameter: 2.3 to 3.1 micron, Ca concentration: 6 wt. %), SHIELDEX AC5 (average particle diameter: 3.8 to 5.2 micron Ca concentration: 6 wt. %), SHIELDEX CS311 (pH 9.5, average particle diameter: 2.5 to 3.5 micron, as reported by the manufacturer using a Malvern Mastersizer™ 2000 particle size analyzer, Malvern Instruments, Ltd., Malvern, UK,) and SHIELDEX SY710 (average particle diameter: 2.2 to 2.5 micron, Ca concentration: 6.6 to 7.5 wt %), all marks of W. R. Grace & Co., Chicago, Ill.

Preferably, the ion-exchanged amorphous silicas have a pH in water of from 8 to 10, or, more preferably 8 to 9.6, such as the silica available as SHIELDEX CS311.

The multicomponent compositions of the present invention further comprise one or more hydrophobic sulfonic acid catalysts, wherein the catalysts have a total water solubility of less than 40 g/100 mL water at 25° C. and 100 kPa (14.51 psi), preferably, 20 g/100 mL or less; a total water solubility of 40 g/100 mL water equals a total water solubility of 40 wt. % in water under the same temperature and pressure conditions.

The hydrophobic sulfonic acid catalysts contain one or more aromatic or alkyl groups. Preferably, the hydrophobic sulfonic acid catalysts are aromatic sulfonic acids having two or more aromatic groups, for example, dinonyl naphthalene disulfonic acid, dinonyl naphthalene sulfonic acid, didodecyl napthalene sulfonic acid and those catalysts available under the mark Nacure™ XC-315 catalyst (King Industries, Norwalk, Conn.), which has a total water solubility of less than 10 g/100 mL at 25° C. and 100 kPa.

The multicomponent compositions of the present invention further comprise one or more carboxylic acid compounds that contain one of a benzothiazole, benzoxazole, or benzimidazole group, such as those described in U.S. Pat. No. 4,612,049 to Berner et al., for example, those chosen from benzthiazol-2-ylthio acetic acid, and benzothiazole substituted dicarboxylic acids, like benzothiazol-2-ylthio succinic acid, and benzthiazol-2-ylthio malonic acid. An example of a suitable carboxylic acid compound that contains a benzothiazole group is Halox™ 650 compound (Halox, a division of ICL\Advanced Additives, Hammond, Ind.).

Preferably, the multicomponent compositions of the present invention further comprise one or more epoxy functional silanes for improving the humidity and corrosion performance of the coating in direct to metal formulations, such as for example epoxy functional hydrolysable silanes, such as oxysilanes like epoxyalkyl trialkoxysilanes.

Epoxy silanes may be used in amounts of from 0 to 5 wt. %, based on the total solids weight of the composition, or, preferably, from 0.1 to 3 wt. %.

An example of a suitable epoxy functional silane is epoxypropyl trimethoxysilane available as SILQUEST A-187 (Momentive Performance Materials, Inc., Waterford, N.Y.).

The compositions of the present invention can comprise from 20 to 90 wt. % of the one or more a) polycarbamates, based on total polycarbamate and polyaldehyde solids, for example, from 25 to 75 wt. %, or, from 30 to 70 wt. %, or, from 35 to 60 wt. %.

The one or more a) polycarbamates can have an average of 2 or more carbamate groups, or, preferably an average of 2.5 or more carbamate groups, such as an average of three or more carbamate groups, or an average of four or more carbamate groups.

Preferably, the one or more a) polycarbamates consists essentially of, and more preferably consists of carbon, hydrogen, nitrogen, and oxygen atoms. Still more preferably the polycarbamate consists of carbon, hydrogen, nitrogen, and oxygen atoms, wherein each nitrogen atom is the nitrogen atom of one of the two or more carbamate groups of the polycarbamate.

The a) polycarbamates of the present invention are substantially isocyanate free. The presence or absence of molecules containing isocyanate groups can be readily confirmed by Fourier Transform Infrared (FT-IR) spectroscopy or carbon-13 nuclear magnetic resonance ($^{13}$C-NMR) spectroscopy.

The a) polycarbamates of the present invention may be prepared by reacting an alkyd polyol or an acrylic polyol with either an unsubstituted carbamic acid alkyl ester or urea, such as urea itself, thiourea, biuret, triuret, N-alkyl substituted ureas that have a low level of toxicity, such as N-methyl urea or N-ethyl urea, and urea clathrates, in the presence of one or more carbamylation catalysts to give the polycarbamate. An example of this reaction is illustrated graphically below in Scheme (a):

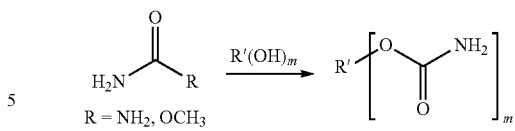

where $R'(OH)_m$ is an alkyd or acrylic polyol and m is 2 or greater.

Suitable alkyd polyols for making the a) polycarbamates of the present invention may be formed from a reactant mixture of one or more monocarboxylic acid oil, one or more polycarboxylic acid having two or more carboxylic acid, salt or halide groups, and one or more polyalcohol comprising a polyalcohol having three or more, preferably from four or more hydroxyl groups, wherein reactant mixture has an excess of total hydroxyl functional groups over total carboxylic, salt, or acyl halide functional groups.

Suitable monocarboxylic acid oils may comprise any fatty acids/triglycerides, saturated monocarboxylic acids or their mixtures, and, are, preferably, drying (polyunsaturated) monocarboxylic acid oils which can be cured with a metal drier. Preferably, the monocarboxylic acid oils are drying (polyunsaturated) oils which can be cured with a metal drier.

Suitable acrylic polyols used for making the one or more a) polycarbamate of the present invention can be any hydroxyl functional acrylic polymer having the desired hydroxyl number or OHEW. Suitable monomers useful for making the one or more acrylic polyols may include, for example, $C_1$ to $C_{13}$ alkyl (meth)acrylates and cycloalkyl (meth)acrylates, such as methyl methacrylate, ethyl acrylate, butyl acrylate and 2-ethylhexyl acrylate, aromatic vinyl monomers, such as styrene and aryl (meth)acrylates, acid functional monomers, such as (meth)acrylic acid, and hydroxyl functional acrylic and vinyl monomers.

Suitable hydroxyl functional acrylic and vinyl monomers for making the acrylic polyol may be any of hydroxyalkyl (meth)acrylates, like hydroxyethyl methacrylate (HEMA), vinyl alcohol, allyl alcohol, and glyceryl methacrylate.

Acrylic polyols generally comprise the polymerization product of from 7 to 50 wt. %, or, preferably, from 20 to 35 wt. % of the hydroxyl functional acrylic and vinyl monomers, based on the total weight of monomers used to make the acrylic polyol, and the remainder of other acrylic or vinyl monomers, such as alkyl, cycloalkyl or aryl (meth)acrylates.

Such acrylic polyols can be made by conventional solution polymerization in an organic solvent in the presence of an oil soluble initiator compound, such as dibenzoyl peroxide, as in known in the art.

Suitable as the one or more b) polyaldehydes of the multicomponent compositions of the present are any compound having two, three, four or more aldehyde groups, or the acetals or hemiacetals thereof. A polyaldehyde having three aldehyde groups is referred to herein as a "trialdehyde". The polyaldehyde can be any aldehyde group containing compound having from 2 to 100 carbons, with the proviso that polyaldehydes having more than 20 carbon atoms will have at least one aldehyde group for every 11 carbon atoms. The polyaldehyde of the present invention is substantially formaldehyde free.

The multicomponent compositions may comprise from 5 to 80 wt. % of the one or more b) polyaldehydes, acetals or hemiacetals thereof component, for example, from 10 to 50 wt. %, based on the total solids weight of the one or more b) polyaldehydes and the one or more a) polycarbamates.

The one or more b) polyaldehydes can be a straight or branched chain aliphatic polyaldehyde; cyclic and non-aromatic polyaldehyde; and/or cyclic and aromatic polyaldehyde.

Suitable polyaldehydes may comprise one or more acyclic, straight or branched polyaldehyde, such as one having from 2 to 16 carbon atoms, or those having 16 carbon atoms prepared by hydroformylating a substantially water insoluble multi-olefin-containing compound that is made from a fatty acid ester or a seed oil, such as a multi-olefin-containing fatty acid triglyceride having 48 carbon atoms or more.

Preferably, the one or more b) polyaldehydes of the present invention comprise one or more cycloaliphatic polyaldehydes, such as, for example, a cycloaliphatic polyaldehyde having from 3 to 20 ring carbon atoms, or, preferably, from 5 to 12 ring carbon atoms.

Preferably, the one or more b) polyaldehydes of the present invention can be a mixture comprising two or more of trans-1,3-cyclohexanedicarboxaldehyde, cis-1,3-cyclohexanedicarboxaldehyde, trans-1,4-cyclohexanedicarboxaldehyde and cis-1,4-cyclohexanedicarboxaldehyde, or protected or blocked forms of these polyaldehydes.

The one or more b) polyaldehydes useful in the present invention can be readily obtained or made by known processes, such as oxidation of corresponding polyols, and as disclosed in U.S. Pat. No. 8,653,174B2, to Anderson et al. For example, a preferred mixture of 1,3- and 1,4-cyclohexanedicarboxaldehydes can be prepared by a process comprising reacting acrolein and 1,3-butadiene in a Diels-Alder reaction to give 3-cyclohexenecarboxaldehyde (also called 1,2,3,6-tetrahydrobenzaldehyde), and hydroformylating the 3-cyclohexenecarboxaldehyde.

The one or more b) polyaldehydes of the present invention can be unblocked and unprotected or blocked or protected. Blocked or protected polyaldehydes can be formed by reacting an unblocked and unprotected polyaldehyde with a suitable blocking or protecting group, such as bisulfites (e.g., from reaction of the polyaldehyde with sodium bisulfite), dioxolanes (e.g., from reaction of the polyaldehyde with ethylene glycol), oximes (e.g., from reaction of the polyaldehyde with hydroxylamine), imines (e.g., from reaction of the polyaldehyde with methylamine), and oxazolidines (e.g., from reaction of the polyaldehyde with a 2-aminoethanol).

Preferred protected b) polyaldehydes comprise, a hydrated group ($>C(OH)_2$), hemiacetal, or acetal, or mixtures thereof. These preferred protected polyaldehydes can be prepared by respectively reacting the polyaldehyde with water; one mole equivalent of an alkanol (e.g., methanol or ethanol); two mole equivalents of the alkanol. The hemiacetal, acetal, protecting groups can, if desired, be removed by a deprotection such as hydrolysis to give back the unprotected form of the polyaldehyde. Such aldehyde protecting or blocking groups and formation and removal (i.e., deprotection) is taught, for example, in U.S. Pat. No. 6,177,514 B1.

Preferably, the one or more b) polyaldehydes of the present invention are stable in neat form (i.e., does not materially self-polymerize) and, more preferably, are substantially water insoluble and stable in neat form.

The multicomponent compositions of the present invention further comprise one or more pigments, fillers or extenders. As used herein a "filler" and an "extender" are treated as one and the same thing. Suitable as the one or more pigments may include, for example, carbon blacks, e.g. lamp black, any colored metal oxides, sulfates, silicates and molybdates of iron, e.g. iron oxides, copper, e.g. copper oxides, titanium, e.g. $TiO_2$ or titanium dioxide, nickel, chromium, lead, e.g. lead sulphate, calcium, magnesium, barium, silicates of copper and manganese, as well as organic colorants or dyes. The one or more pigments, fillers or extenders include mixtures or combinations of any of the above, preferably one or more pigments with one or more extenders.

Organic colorants or dyes, such as mono and di-azo pigments such as toluidine red and quinacrodone red, phthalocyanines, ferrocyanates, and molybdates may be present in the amount of up to 1 wt. %, or from 0.0001 to 1 wt. %, based on the total weight of solids in the multicomponent compositions.

Suitable as the one or more fillers or extenders may include, for example, silica, such as fume silica, clay, mica, talc, diatomaceous earth, aluminum silicates, microspheric ceramic beads, zinc oxide, barium sulphate and nepheline syenite.

Preferably, the one or more fillers or extenders is free of basic fillers, such as calcium carbonate.

Preferably, the one or more filler or extender is silica, talc, diatomaceous earth and mixtures containing any of these.

The ambient temperature curable multicomponent compositions of the present invention which comprise a) polycarbamates from drying oil alkyd polyols may further comprise one or more metal driers or drier salts, as are well-known in the art and commercially available. Examples of suitable driers are metal salts of (cyclo)aliphatic, natural or synthetic acids, such as, for example, linoleic acid, naphthenic acid and 2-ethyl-hexanoic acid. Iron, calcium and zinc are suitable drier metals. Mixtures of driers can also be used. In terms of their metal content, the driers are used in a proportion of 0.001 to 3 wt. %, relative to the total solids of the multicomponent compositions.

The multicomponent compositions of the present invention may further comprise, conventional additional ingredients, for example, solvents/diluents, rheology modifiers, flow control agents, leveling agents, surfactants, dispersing agents, wetting agents, ultraviolet (UV) light stabilizers, adhesion promoters, catalysts, cure retarders, and auxiliaries.

Advantageously, the multicomponent compositions of the present invention for coating use have a total solids content within the range of from 30 to 90% by volume. So, the coating compositions comprising multicomponent compositions of the present invention can be used as high solids compositions with reduced amounts of volatile organic compounds (VOCs) in low VOC automotive coating compositions, for example, amounts of at most 400 g/L or at most 250 g/L of volume.

A solvent or a blend of solvents is generally utilized to reduce the coating composition to an optimum spray viscosity. Examples of suitable solvents are non-polar or polar organic solvents such as, for example, an aromatic hydrocarbon, aliphatic hydrocarbon, ether, carboxylic ester, ketone, or a mixture of two or more thereof. Examples of suitable solvents include acetone, methyl ethyl ketone, methyl isobutyl ketone, methyl amyl ketone, toluene, xylenes, petroleum distillates, such as Aromatic 100, ethyl acetate and butyl acetate. Preferably, a blend of solvents is used.

Preferably, to reduce or eliminate the correlation between pot life of a composition and coating drying time or coating dry to sand time, or both upon curing thereof, the multicomponent compositions of the present invention comprise one or more curing inhibitors, such as, for example, water or an alcohol, or both. The curing inhibitor delays onset of or increases the cure time of the compositions of the present invention, or both. The curing inhibitor can enable the composition to maintain, if desired, a long pot life (e.g. several hours to several days) and can be removed, e.g. by evaporation, when cure is desired. Suitable curing inhibitors have a boiling point at atmospheric pressure of from ambient temperature to 300° C., or, preferably, at most 250° C., or, more preferably, at least 30° C. or at most 200° C.

The one or more curing inhibitors may be used in total amounts of from 0 to 90 wt. %, or, preferably, from 0.5 wt. % to 60 wt. % or, more preferably, at most 50 wt. %, or, still more preferably, at least 1 wt. % or at most 30 wt. %, based on the total weight of solids of the composition of the present invention. Most preferably, the curing inhibitors are used in total amounts of less than 20 wt. %, or even still more preferably, less than 10 wt. %, based on the total weight of solids of the composition of the present invention.

Suitable UV light stabilizers are any such as hindered amines, like bis-(1-octyloxy-2,2,6,6-tetramethyl-4-piperidinyl) sebacate (e.g. Tinuvin™ 123 light stabilizer supplied by BASF, Leverkusen, DE); suitable dispersing agents are any such as polyphosphoric acid polyesters (e.g. Disperbyk™ 110 supplied by BYK USA, Inc., Wallingford, Conn.); suitable leveling agents are such as polyether modified polydimethylsiloxanes; and rheology modifiers such as organowaxes (e.g. Troythix™ 21 BA wax supplied by Troy Corporation Florham Park, N.J.).

Preferably, methods of using the multicomponent compositions of the present invention comprise applying the compositions to at least a portion of the surface of the substrate and curing the curable coating of the multicomponent compositions so as to prepare a coated substrate comprising a crosslinked polyurethane.

The curing temperature of the ambient temperature curable composition is from ambient temperature to 80° C., or, preferably, 60° C. or lower, or, more preferably 40° C. or lower, or, even more preferably, 30° C. or lower. A preferred minimum effective curing temperature is a minimum temperature effective for curing the invention ambient temperature curable composition to yield the invention crosslinked polyurethane within 7 days. The ambient temperature for curing may be 0° C. or more or up to 40° C., or, at least 10° C. A preferred ambient temperature for curing is from 20° C. to 30° C.

The multicomponent compositions can be applied to the surface of the substrate(s) by any suitable applying means such as, for example, brushing, spraying, or dipping.

EXAMPLES

Unless otherwise specified, all temperatures are room temperature and all pressures are 1 atmosphere or ambient pressure.

Example A: Two Stage Alkyd Polyol Synthesis

First Stage: Alcoholysis. To a 5 L three-neck round bottom flask was added sunflower oil (1388.9 g). A glass stir rod and paddle were placed in the middle joint of the flask. The flask was attached to a lattice with overhead stirring, and an oil bath at room temperature was raised to submerge the flask. The setpoint on the bath was 220° C. and heating and stirring were started. To the stirred oil, pentaerythritol (713.6 g) and dibutyltin catalyst (1200 ppm on total reactor charge) were added. Once all reactants were added, a packed condenser with a set point of 95° C. was attached to one of the side joints and topped with a hose adaptor that was connected to a bubbler. To the other side neck, a second hose-adaptor was attached and connected to a nitrogen inlet. A slow nitrogen sweep was placed on the system and observed in the bubbler. The reaction mixture was allowed to heat and mix overnight to ensure high conversion. This stage was completed when a "monoglyceride" of the sunflower oil was achieved, meaning that the reactor contents homogeneously dispersed in methanol at one part resin to three parts methanol.

Second Stage. The 5 L three-neck flask containing the alcoholysis mixture from the first stage was equipped with a glass stir shaft and paddle. The flask was attached to a lattice with overhead stirring. An oil bath at room temperature was raised to submerge the flask. The set point on the bath was 220° C. and heating and stirring were started. To the flask, isophthalic acid (359.0 g), phthalic anhydride (538.5 g), and xylenes (2% on total charge) were added. Then, a Dean-Stark trap was connected to one of the side joints and topped with a Friedrichs condenser connected to an outlet bubbler. A nitrogen sweep was placed on the system. The system was allowed to heat (220° C.) and the water formed was distilled out as an azeotrope with xylenes. This second stage of the reaction was monitored by removing samples from the reactor and titrating the acid value (AV). The reaction was allowed to progress until the desired AV (8.0 mg KOH/g) was reached. The alkyd polyol had a measured OH number of 180 mg KOH/g (on solids). Then the reaction contents were poured into a glass jar and allowed to cool to room temperature under a pad of nitrogen.

Example B: Alkyd Polycarbamate Synthesis

A reaction was carried out in a 2000 ml round bottom reactor system equipped with a mechanical stirrer, reflux condenser, nitrogen gas purge system and temperature control. A heating mantle was used for temperature control. The reactor was charged with the alkyd polyol (2000 g) from Example A, above, diluted to a final solids level of 60-70% in xylene, to achieve a process viscosity which allowed efficient stirring at 140° C. The catalyst, Fascat™ 4201 dibutyl tin oxide (DBTO, Arkema, Inc., Philadelphia, Pa.), was added to the alkyd polyol in the reactor at 0.6 wt. % on solids. The amount urea (99.5 wt. % pure, Sigma-Aldrich, St. Louis, Mo.) used was calculated based on the hydroxyl value for the alkyd polyol to target 62% conversion of the hydroxyl groups. For the 2000 g batch of alkyd polyol, 238.7 g total of urea was first dissolved in distilled water to make a 50 wt % aqueous solution. The alkyd-solvent-catalyst mixture in the reactor was slowly heated to 140° C. and nitrogen purged for at least 30 min. Urea solution was loaded into 60 ml glass syringes and was carefully fed into the reactor at a constant controlled rate through a syringe pump. The urea solution was steadily fed into the reactor over 6-10 hrs. Azeotropic vapor was formed and cooled in the condenser, which was then collected in the Dean-Stark trap. The reaction was carefully maintained at 140° C., mixing at 500-600 rpm and continued for 10-12 hr until completion. Samples were taken periodically for NMR and GPC analysis. The Carbamate Conversion (from hydroxyl to carbamate) was calculated at 59%.

The polycarbamate from Example B was formulated as shown in Example 1, below.

Examples 1 and 1A: Multicomponent Composition Formulation of Polycarbamate from Alkyd Polyol

TABLE 1

Formulation of a multicomponent composition of Example 1

| Material | Weight (g) |
|---|---|
| Component A | |
| Alkyd polycarbamate (53.5 wt % in xylene, EW on solids = 318.8 as determined by hydroxyl value titration) | 36.17 |
| Toluene (solvent) | 15.23 |
| Methyl ethyl ketone (solvent) | 7.41 |
| DISPERBYK-110 (carboxylic acid functional solution polymer dispersant 52% solids in methoxypropylacetate/alkylbenzenes (Byk USA, Wallingford, CT) | 0.94 |
| Tiona ™ 595 $TiO_2$ (Cristal, Hunt Valley, MD) | 4.16 |
| Nicron ™ Talc 665 (Imerys, Paris, France | 4.16 |
| Shieldex ™ CS311 calcium containing ion-exchanged amorphous silica (W.R.Grace, Chicago, IL) | 6.76 |
| Halox ™ 650 Organic Diacid (benzthiazol-2-ylthio succinic acid) (CAS 95154-01-1, ICL\Advanced Additives, Hammond, IN) | 1.47 |
| Milwhite ™ B1 barytes (Milwhite, Brownsville, TX) | 4.76 |
| Grind Sub-Total | 81.07 |
| Let Down | |
| Ethanol | 9.88 |
| Diacetone alcohol | 1.98 |
| Total Part A | 92.93 |
| Silquest ™ A-187 Epoxy Silane (Momentive) | 0.65 |
| Cyclohexanedicarboxaldehyde (CHDA, EW as received = 78.35, EW on active solids = 70) | 4.76 |
| Dinonylnaphthalene Disulfonic Acid (DNNDSA) (55 wt % in isopropanol) | 1.67 |
| Total | 100.00 |

TABLE 1A

Comparative formulation of Example 1A*

| Material | Grams |
|---|---|
| Alkyd polycarbamate (53.5 wt % in xylene, EW on solids = 318.8 as determined by hydroxyl value titration | 34.11 |
| Xylene (solvent) | 0.31 |
| Toluene (solvent) | 14.49 |
| MEK (solvent) | 7.05 |
| DISPERBYK-110 (carboxylic acid functional solution polymer dispersant 52% solids in methoxypropylacetate/alkylbenzenes, Byk USA, Wallingford, CT) | 1.09 |
| Tiona ™ 595 $TiO_2$ (Cristal, Hunt Valley, MD) | 6.88 |
| Nicron ™ Talc 665 (Imerys, Paris, France) | 6.88 |
| Burgess Optiwhite ™, Calcined aluminum silicate pigment (Burgess Pigment, Sanderson, GA) | 4.39 |
| Milwhite ™ B1 barytes (Milwhite, Brownsville, TX) | 7.83 |
| Grind Sub-total | 83.04 |
| LetDown | |
| Ethanol | 9.40 |
| Diacetone alcohol | 1.88 |
| Total Part A | 94.32 |
| CHDA (EW as received = 78.35; EW on active solids = 70) | 4.53 |
| Dinonylnaphthalene Disulfonic Acid (DNNDSA) (55 wt. % in isopropanol) | 1.15 |
| Total | 100.00 |

*Denotes Comparative Example.

For Example 1, Part A was prepared using overhead mixing with a Dyspermat™ mixer (VMA-Getzman, Reichshof, DE). A Hegman gauge was used to determine how finely ground the pigments are dispersed in the paint. The mixed paint had a value of 5.5 Hegman units or greater. To the Part A, CHDA was added with overhead stirring followed by the addition of the hydrophobic sulfonic acid ester catalyst, DNNDSA, prior to spraying.

For Example 2, Part A used the same process as Example 1 and 1A. Part B was prepared the day before use where to the ethanol was added CHDA followed by the XC-315 catalyst. Part B was added to Part A prior to spraying.

TABLE 2

Example 2 - Formulation of a multicomponent composition

| Material | Weight (g) |
|---|---|
| Component A | |
| Alkyd polycarbamate (56.7 wt % in xylene, EW on solids = 339.2 as determined by hydroxyl value titration) | 34.40 |
| Xylene (solvent) | 2.02 |
| Toluene (solvent) | 15.34 |
| Methyl ethyl ketone (solvent) | 7.46 |
| DISPERBYK-110 (carboxylic acid functional solution polymer dispersant 52% solids in methoxypropylacetate/alkylbenzenes (Byk USA, Wallingford, CT) | 0.95 |
| Tiona ™ 595 $TiO_2$ (Cristal, Hunt Valley, MD) | 4.19 |
| Nicron ™ Talc 665 (Imerys, Paris, FR) | 4.19 |
| Shieldex ™ CS311 calcium containing ion-exchanged amorphous silica (W.R.Grace) | 6.81 |
| Halox ™ 650 Organic Diacid (benzthiazol-2-ylthio succinic acid) (CAS 95154-01-1 (ICL\Advanced Additives, Hammond, IN) | 1.48 |
| Milwhite ™ B1 barium sulfate (Milwhite, Brownsville, TX) | 4.79 |
| Diacetone alcohol (solvent) | 1.99 |
| Total Part A | 82.63 |
| Part B | |
| Ethanol | 9.97 |
| Cyclohexanedicarboxaldehyde (CHDA, EW as received = 74, EW on active solids = 70) | 4.32 |
| Hydrophobic sulfonic acid XC-315 (King Industries, Norwalk, CT) | 2.08 |
| Total | 100.00 |

Each formulation was sprayed in two coats, with a 10 minute flash time in between each coat. The time to sand was measured after the second 10 minute flash of the second applied coating. The coating was applied to cold roll steel panels sanded with 80 grit sand paper. For panels with base and clear coats, the base and clear coat were applied after the primed panels were sanded. A commercial black base coat was then applied after the panels were sanded according to manufacturer's recommendations. A commercial clear coat (2 coats sprayed) was applied over the base coat according to the manufacturer's recommendations. The panels were cured overnight at room temperature prior to evaluations.

Substrate Preparation:

For Example 1 and 1A, cold roll steel test panels were prepared for refinish with a Hutchens 4500 (Hutchens, Pasadena, Calif.) 15 cm finish DA sander with 80 grit sandpaper. After the panel was sanded smooth, the pane panel off with compressed air to remove dust from the prepared surface. Using a red Scotch-Brite™ pad scuff (3M, Minneapolis, Minn.) the surface in a uniform direction until all scuff marks are the same depth and direction.

The applied formulations in the indicated Examples 1 and 1A to 2 were tested, as follows.

Test Methods:

Time to Sand:

The sandability was determined by the time reached where using hand sanding, 320 grit sandpaper did not cake with primer and material was easily shaken or knocked off the sand paper. An acceptable result would be ability to sand in less than 1 h. Sanding results for Examples 1 and Comparative Example 1 are presented in Table 1.

Thickness of the Coating:

Measured by ASTM D7091-05 (Standard Practice for Nondestructive Measurement of Dry Film Thickness of Nonmagnetic Coatings Applied to Ferrous Metals and Nonmagnetic, Nonconductive Coatings Applied to Non-Ferrous Metals (2005)).

MEK Double Rub Resistance:

In Examples 1 to 1A and 2, a MEK Rub test Machine (DJH Designs, Oakville, ON, CA) was used to evaluate coating resistance to methyl ethyl ketone (MEK) similar to ASTM D 4752-98 (1998). Coatings were cured at room temperature (24° C.) and 50% relative humidity for the indicated time. The tester moved a cotton pad, attached to a weighted block that applies a force of 0.155 Kg/cm2 (~2.2 lb/in2), in a back and forth motion across the coated panel. Each back and forth is referred to as one double rub. Rubbing was continued until the indicated failure occurred, and that number of double rubs was recorded. Unless otherwise indicated, rubbing was continued until the coating was cut through and the substrate became visible in any area, and that number of double rubs was recorded. An acceptable result is at least 100-200 double rubs.

Tape Crosscut Adhesion:

Crosscut adhesion was measured and rated according to a modified version of ASTM D-3359-09 (2009) where a 10 cm piece of Permacel™ 99 pressure adhesive (3M, Minneapolis, Minn.) tape was laid over the indicated 20 coating and a 3 mm blade was used to make a crosscut in testing how well the coating adheres to the substrate when the tape is pulled off. ASTM ratings range from 0 A to 5 A where a rating of 5 A is desired. According to the method, the scale reads as: 5 A (no peeling or removal); (4 A) Trace peeling or removal along incisions or at their intersection; (3 A) Jagged removal along incisions up to 1.6 mm (1/16 in.) 25 on either side; (2 A) Jagged removal along most of incisions up to 3.2 mm (1/8 in.) on either side; (1 A) Removal from most of the area of the X under the tape; and (0 A) Removal beyond the area under the tape. An acceptable result is 4 A or higher.

Humidity Resistance Testing:

Coated panels were cured for 7 days at ambient temperature prior to being placed on a Cleveland humidity chamber with 100% condensing humidity at 38° C. for 96 h before observation for blistering and defects.

TABLE 3

Time to Sand the Primer

| | Example 1 | Comparative Example 1A | Example 2 |
|---|---|---|---|
| Time to sand primer (min) | 40 | 40 | 40 |

TABLE 3A

Coating performance

| | Example 1 With Corrosion Inhibitor | | | | Comparative Example 1A* Without Corrosion Inhibitor | | | |
|---|---|---|---|---|---|---|---|---|
| Coated Panel | Primer | Primer | Primer/ Base/ Clear | Primer/ Base/ Clear | Primer | Primer | Primer/ Base/ Clear | Primer/ Base/ Clear |
| Film Thickness (microns) | 83.8 | 88.9 | | | 86.4 | 86.4 | | |
| MEK double rubs | | | | | | | | |
| 24 h Initial Damage/Mar | <5 | <5 | | | <5 | <5 | | |
| 24 h 25% Film Loss or 200 rubs | 133 | >200 | | | 197 | >200 | | |
| 7 d Initial Damage/Mar | <5 | <5 | | | <5 | <5 | | |
| 7 d 25% Film Loss or 200 rubs | >200 | >200 | | | >200 | >200 | | |
| Cross Hatch Adhesion | | | | | | | | |
| 24 hour | 4B | 4B | 5B | 5B | 5B | 5B | 5B | 5B |
| 7 Day | 3B | 3B | 5B | 5B | 5B | 5B | 5B | 5B |

*Denotes Comparative Example.

TABLE 3B

Coating performance

| | Example 2 With Corrosion Inhibitor | | | |
|---|---|---|---|---|
| Coated Panel | Primer | Primer | Primer/ Base/ Clear | Primer/ Base/ Clear |
| Film Thickness (microns) | 71.9 | 85.6 | 133.9 | 116.4 |
| MEK double rubs | | | | |
| 24 h Initial Damage/Mar | <5 | <5 | | |
| 24 h 25% Film Loss or 200 rubs | >200 | >200 | | |
| 7 d Initial Damage/Mar | <5 | <5 | | |
| 7 d 25% Film Loss or 200 rubs | >200 | >200 | | |
| Cross Hatch Adhesion | | | | |
| 24 hour | 5B | 5B | 5B | 5B |
| 7 Day | 5B | 5B | 4B | 5B |

TABLE 4

Coating humidity performance[1]

| Coated panels | Example 1 With Corrosion Inhibitor | | Example 1A* Without Corrosion Inhibitor | | Example 2 With Corrosion Inhibitor | |
|---|---|---|---|---|---|---|
| | Primer | Primer/Base/Clear | Primer | Primer/Base/Clear | Primer | Primer/Base/Clear |
| Film Thickness (microns) | 76.2 | 147.3 | 53.3 | 121.9 | 81.28 | 128.79 |
| Observations post humidity exposure* | No blisters observed | No blisters observed | 1-4 mm blisters, 60% of panel | 1-3 mm blisters, all panel | No blisters observed | No blisters observed |

*Denotes Comparative Example; 1. Panels cured for 7 day at ambient temperature prior to humidity exposure (Cleveland humidity chamber) for 96 h at 38° C. (100% condensing humidity).

As shown in Tables 3A, 3B and 4, above, the Example 1 and 2 inventive primer exhibits improved humidity resistance (Table 4) as observed by no blistering of the coated panels. The inventive Examples do not compromise the ability to sand the primer in less than 1 h, sanding in the same time as the comparative example (40 min). In addition, there was no rusting observed in any panels containing the inventive primer.

We claim:

1. A substantially isocyanate free, multicomponent primer composition curable at 0 to 80° C., having from 0 to 5 mole percent isocyanate (N=C=O) groups, based on total moles of carbamate groups plus isocyanate groups in the composition, and useful for direct to metal coatings comprising:
   one or more pigments, extenders and/or fillers, providing a pigment volume concentration of from 15 to 60%,
   from 2.5 to 14.4 wt. % of one or more ion-exchanged amorphous silicas containing a metal cation, based on the total solids weight of the primer composition,
   from 0.5 to 5 wt. % of one or more carboxylic acid compounds that contain one of a benzothiazole, benzoxazole, or benzimidazole group, based on the total solids weight of the primer composition,
   from 0.01 to 10 wt. % of one or more hydrophobic sulfonic acid catalysts, based on the total solids weight of the primer composition,
   from 20 to 90 wt. % of one or more a) polycarbamates of an alkyd polyol, based on the total polycarbamate and polyaldehyde solids,
   from 10 to 80 wt. % of one or more b) polyaldehydes, or acetals or hemiacetals thereof, in a component separate from the one or more polycarbamates, based on the total polycarbamate and polyaldehyde solids.

2. The multicomponent composition as claimed in claim 1, wherein the one or more ion-exchanged amorphous silicas contains a divalent or trivalent metal cation.

3. The multicomponent composition as claimed in claim 2, wherein the one or more ion-exchanged amorphous silicas contains calcium or zinc as the divalent or trivalent metal cation.

4. The multicomponent composition as claimed in claim 1, wherein the one or more carboxylic acid compounds contains a benzothiazole group.

5. The multicomponent composition as claimed in claim 1, wherein the one or more carboxylic acid compounds contains a benzothiazole group and is a dicarboxylic acid compound.

6. The multicomponent composition as claimed in claim 1, wherein the one or more hydrophobic sulfonic acid catalysts have a solubility in water at 25° C. of less than 40 wt. %.

7. The multicomponent composition as claimed in claim 1, further comprising one or more epoxy silane.

8. The multicomponent composition as claimed in claim 1, wherein the one or more a) polycarbamates is a polycarbamate prepared from an alkyd polyol having a hydroxyl number from 50 to 250.

9. The multicomponent composition as claimed in claim 1, wherein the alkyd polyol is a short or medium oil alkyd polyol.

10. The multicomponent composition as claimed in claim 1, wherein the alkyd polyol is a drying oil alkyd polyol.

11. The multicomponent composition as claimed in claim 1, wherein the alkyd polyol is the reaction product of one or more monocarboxylic fatty acids or triglycerides, one or more polycarboxylic acids having two or more carboxylic acid, salt or halide groups, and one or more polyalcohols having two or more hydroxyl groups.

12. The multicomponent composition as claimed in claim 1, wherein the one or more b) polyaldehydes, or acetals or hemiacetals thereof, is a 1,3-cyclohexanedicarboxaldehyde (CHDA), a 1,4-cyclohexanedicarboxaldehyde (CHDA), their admixture, or acetals or hemiacetals thereof.

13. The multicomponent composition as claimed in claim 1, wherein the composition further comprise one or more curing inhibitors comprising water or a $C_1$ to $C_5$ alkyl alcohol.

14. The multicomponent composition as claimed in claim 1, comprising titanium dioxide and talc or silica.

15. A method for making the multicomponent composition as claimed in claim 1, comprising grinding together the one or more ion-exchanged amorphous silicas, the one or more carboxylic acid compounds, and the one or more hydrophobic sulfonic acid catalysts with the one or more pigments, extenders, and/or fillers, with one or more dispersants to form a pigment mixture.

16. A method for using the multicomponent composition as claimed in claim 1, comprising applying the composition to a metal substrate to form a coating layer, and curing the coating layer at a temperature of from ambient to 80° C. to form a crosslinked polyurethane.

17. The method as claimed in claim 16, further comprising applying a pigmented basecoat or colorcoat composition to the coating layer to form a pigmented basecoat or colorcoat layer and curing the pigmented basecoat or colorcoat layer to form a cured pigmented basecoat or colorcoat.

18. The method as claimed in claim 17, further comprising applying a clearcoat composition to the cured pigmented basecoat or colorcoat layer, and curing the clearcoat composition to form an automotive coating finish.

19. An automotive coating finish comprising:
   a metal substrate,
   one or more crosslinked polyurethane coating layers, formed from the composition as claimed in claim 1, on the metal substrate,
   a cured pigmented basecoat or colorcoat layer on the one or more crosslinked polyurethane coating layers, and
   a cured clearcoat layer on the cured pigmented basecoat or colorcoat layer.

* * * * *